US011262071B2

(12) United States Patent
Prenter et al.

(10) Patent No.: US 11,262,071 B2
(45) Date of Patent: Mar. 1, 2022

(54) COMBUSTOR PARTICULATE DEFLECTOR

(71) Applicant: United Technologies Corporation, Farmington, CT (US)

(72) Inventors: Robin Prenter, Avon, CT (US); Ryan Lundgreen, Granby, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 174 days.

(21) Appl. No.: 16/520,853

(22) Filed: Jul. 24, 2019

(65) Prior Publication Data
US 2021/0025595 A1 Jan. 28, 2021

(51) Int. Cl.
*F23R 3/00* (2006.01)
*F23R 3/04* (2006.01)
*F23R 3/42* (2006.01)

(52) U.S. Cl.
CPC ............... *F23R 3/002* (2013.01); *F23R 3/04* (2013.01); *F23R 3/42* (2013.01); *F05D 2260/607* (2013.01)

(58) Field of Classification Search
CPC .... F23R 3/002; F23R 3/04; F23R 3/60; F23R 3/46; F02C 7/05; F02C 7/052; F02C 7/055; F05D 2260/607; B64D 2033/022; B64D 2033/0246
See application file for complete search history.

(56) References Cited

U.S. PATENT DOCUMENTS

| 3,169,367 | A | * | 2/1965 | Hussey | F23R 3/46 60/39.37 |
| 4,896,510 | A | * | 1/1990 | Foltz | F23R 3/002 60/757 |
| 5,331,815 | A | | 7/1994 | Reinhold, Jr. et al. | |
| 2009/0255230 | A1 | * | 10/2009 | Mildner | F01D 9/023 60/39.092 |
| 2017/0122561 | A1 | * | 5/2017 | Nagaraj | F01D 5/288 |
| 2018/0023473 | A1 | | 1/2018 | Mateiga et al. | |
| 2018/0266278 | A1 | | 9/2018 | Paillard et al. | |

FOREIGN PATENT DOCUMENTS

| EP | 1903283 A1 | 3/2008 |
| EP | 1950497 A1 | 7/2008 |
| EP | 3502563 A2 | 6/2019 |
| EP | 3511625 | 7/2019 |

OTHER PUBLICATIONS

The Extended European Search Report for Application No. 20186174.3-1009; dated Nov. 16, 2020; Report Recieved Date: Nov. 26, 2020; 6 pages.

* cited by examiner

*Primary Examiner* — Stephanie Sebasco Cheng
(74) *Attorney, Agent, or Firm* — Cantor Colburn LLP

(57) ABSTRACT

A gas turbine engine, including: a diffuser case defining an inner shroud and an outer shroud; and a combustor housed within the diffuser case between the inner shroud and the outer shroud, the combustor including: a shell; a forward dome attached to the shell at a forward end of the combustor; and a deflector attached to the forward dome and extending away from the forward dome.

16 Claims, 6 Drawing Sheets

COMBUSTOR PARTICULATE DEFLECTOR

BACKGROUND

The subject matter disclosed herein generally relates to gas turbine engines and, more particularly, to a method and apparatus for mitigating heat in cooling surfaces of gas turbine engines.

In one example, a combustor of a gas turbine engine may be configured to burn fuel in a combustion area. Such configurations may place substantial heat load on the structure of the combustor (e.g., heat shield panels, shells, etc.). Such heat loads may dictate that special consideration is given to structures, which may be configured as heat shields or panels, and to the cooling of such structures to protect these structures. Excess temperatures at these structures may lead to oxidation, cracking, and high thermal stresses of the heat shields panels.

SUMMARY

Disclosed is a gas turbine engine, the gas turbine engine including: a diffuser case defining an inner shroud and an outer shroud; and a combustor housed within the diffuser case between the inner shroud and the outer shroud, the combustor including: a shell; a forward dome attached to the shell at a forward end of the combustor; and a deflector attached to the forward dome and extending away from the forward dome.

In addition to one or more of the features described above, or as an alternative to any of the foregoing embodiments, the deflector extends aft-ward and in a radially inward direction away from the forward dome and into the inner shroud.

In addition to one or more of the features described above, or as an alternative to any of the foregoing embodiments, the deflector is attached to a radially inward side of the forward dome.

In addition to one or more of the features described above, or as an alternative to any of the foregoing embodiments, the forward dome further includes: a curved dome portion; and a radially inward linear portion, the forward dome being attached to the shell at the radially inward linear portion, wherein the forward dome transitions from the curved dome portion to the radially inward linear portion at a radially inward transition point, and wherein the deflector is attached to the forward dome proximate the radially inward transition point.

In addition to one or more of the features described above, or as an alternative to any of the foregoing embodiments, the deflector is a solid body.

In addition to one or more of the features described above, or as an alternative to any of the foregoing embodiments, the deflector further includes: a radially inward forward side; a radially outward aft side opposite the radially inward forward side; and one or more orifices extending from the radially inward forward side to the radially outward aft side.

In addition to one or more of the features described above, or as an alternative to any of the foregoing embodiments, the one or more orifices are oriented at an angle less than or equal to 90 degrees relative to the radially inward forward side.

In addition to one or more of the features described above, or as an alternative to any of the foregoing embodiments, the one or more orifices include corners that are rounded in shape, the corners being adjacent to at least one of the radially inward forward side and the radially outward aft side.

In addition to one or more of the features described above, or as an alternative to any of the foregoing embodiments, a catcher is located opposite of the deflector on a radially inward wall of the diffuser case, the catcher forming an internal chamber with the radially inward wall, wherein the catcher comprises a forward opening to allow particulate to enter into the internal chamber.

In addition to one or more of the features described above, or as an alternative to any of the foregoing embodiments, the catcher further includes a rear backstop located aft of the forward opening.

In addition to one or more of the features described above, or as an alternative to any of the foregoing embodiments, a radially inward exit orifice in the radially inward wall, the radially inward exit orifice being fluidly connected to the internal chamber of the catcher.

In addition to one or more of the features described above, or as an alternative to any of the foregoing embodiments, the deflector is oriented at an angle relative to a longitudinal axis of the gas turbine engine about equal to an angle of the curved dome portion proximate the radially inward transition point relative to the longitudinal axis of the gas turbine engine.

Also disclosed is a combustor for use in a gas turbine engine, the combustor including: a shell; a forward dome attached to the shell at a forward end of the combustor; and a deflector attached to the forward dome and extending away from the forward dome.

In addition to one or more of the features described above, or as an alternative to any of the foregoing embodiments, the deflector extends aft-ward and in a radially inward direction away from the forward dome.

In addition to one or more of the features described above, or as an alternative to any of the foregoing embodiments, the deflector is attached to a radially inward side of the forward dome.

In addition to one or more of the features described above, or as an alternative to any of the foregoing embodiments, the forward dome further includes: a curved dome portion; and a radially inward linear portion, the forward dome being attached to the shell at the radially inward linear portion, wherein the forward dome transitions from the curved dome portion to the radially inward linear portion at a radially inward transition point, and wherein the deflector is attached to the forward dome proximate the radially inward transition point.

In addition to one or more of the features described above, or as an alternative to any of the foregoing embodiments, the deflector is a solid body.

In addition to one or more of the features described above, or as an alternative to any of the foregoing embodiments, the deflector further includes: a radially inward forward side; a radially outward aft side opposite the radially inward forward side; and one or more orifices extending from the radially inward forward side to the radially outward aft side.

In addition to one or more of the features described above, or as an alternative to any of the foregoing embodiments, the one or more orifices are oriented at an angle less than or equal to 90 degrees relative to the radially inward forward side.

In addition to one or more of the features described above, or as an alternative to any of the foregoing embodiments, the one or more orifices include corners that are rounded in shape, the corners being adjacent to at least one of the radially inward forward side and the radially outward aft side.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Figure 1:
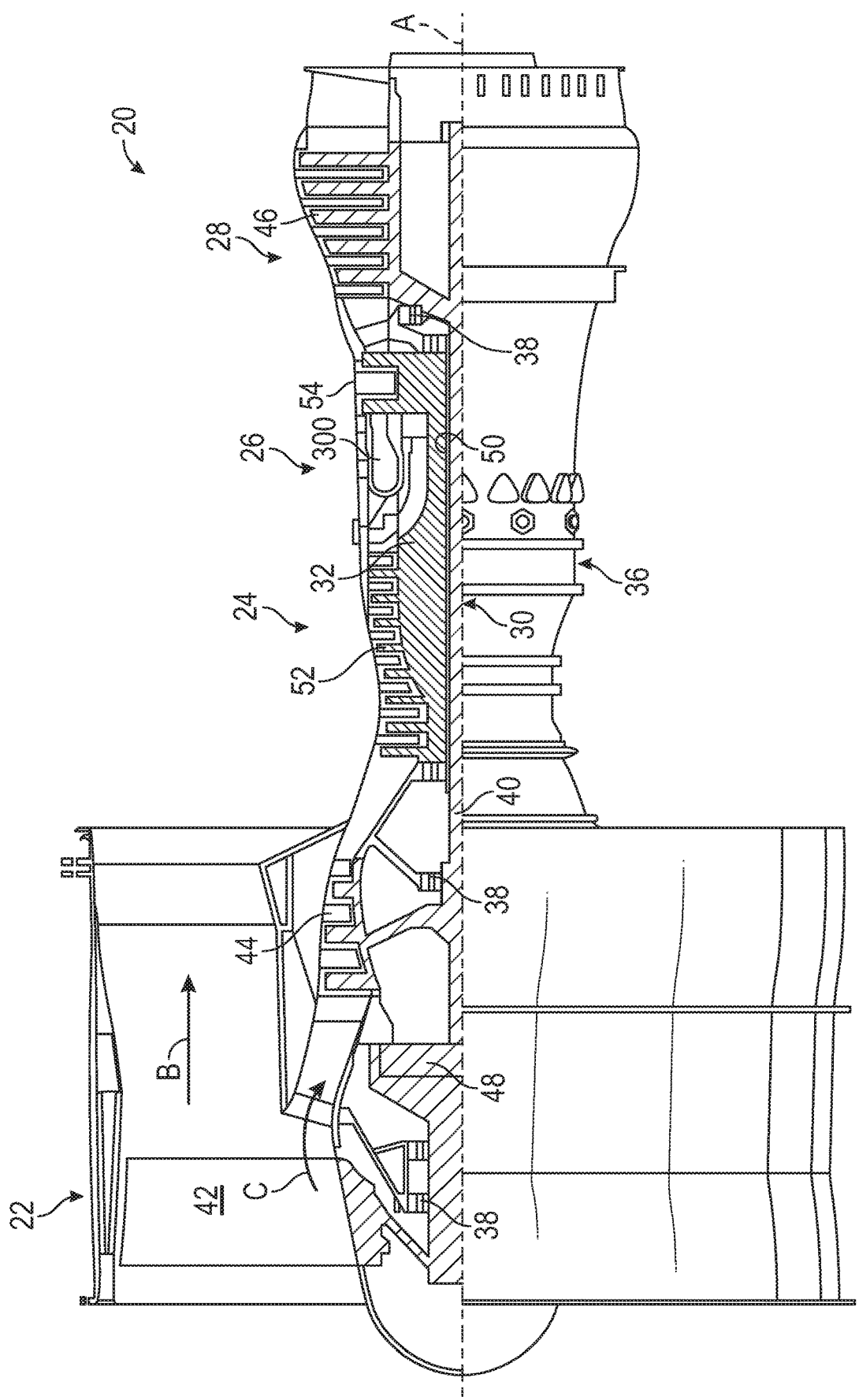
FIG. 1 is a partial cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 300 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 300, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7°R)]$^{0.5}$. The "Low corrected fan tip speed" as disclosed herein according to one non-limiting embodiment is less than about 1150 ft/second (350.5 m/sec).

Figure 2:
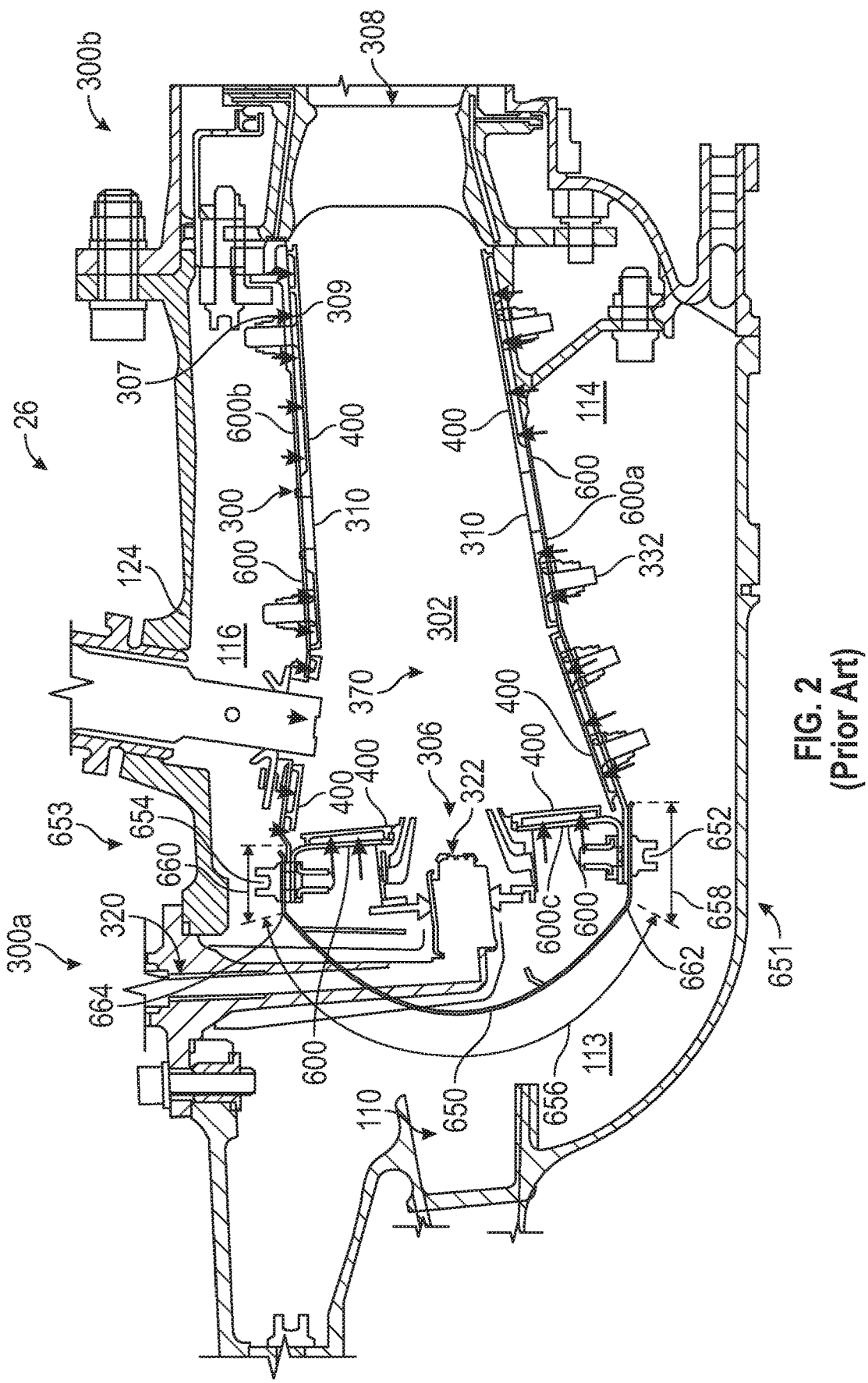
FIG. 2 is a cross-sectional illustration of a combustor.

Referring now to FIG. 2, with continued reference to FIG. 1, the combustor section 26 of the gas turbine engine 20 is shown. The combustor 300 of FIG. 2 is an impingement film float wall combustor. It is understood that while an impingement film float wall combustor is utilized for exemplary illustration, the embodiments disclosed herein may be applicable to other types of combustors for gas turbine engines including but not limited to double pass liner combustors, float wall combustors, and combustors with single wall liners.

As illustrated, a combustor 300 defines a combustion chamber 302. The combustion chamber 302 includes a combustion area 370 within the combustion chamber 302. The combustor 300 includes an inlet 306 and an outlet 308 through which air may pass. The air may be supplied to the combustor 300 by a pre-diffuser 110. Air may also enter the combustion chamber 302 through other holes in the combustor 300 including but not limited to quench holes 310, as seen in FIG. 2.

Compressor air is supplied from the compressor section 24 into a pre-diffuser 110, which then directs the airflow toward the combustor 300. The combustor 300 and the pre-diffuser 110 are separated by a dump region 113 from which the flow separates into an inner shroud 114 and an outer shroud 116. As air enters the dump region 113, a portion of the air may flow into the combustor inlet 306, a portion may flow into the inner shroud or plenum 114, and a portion may flow into the outer shroud or plenum 116.

Figure 3:
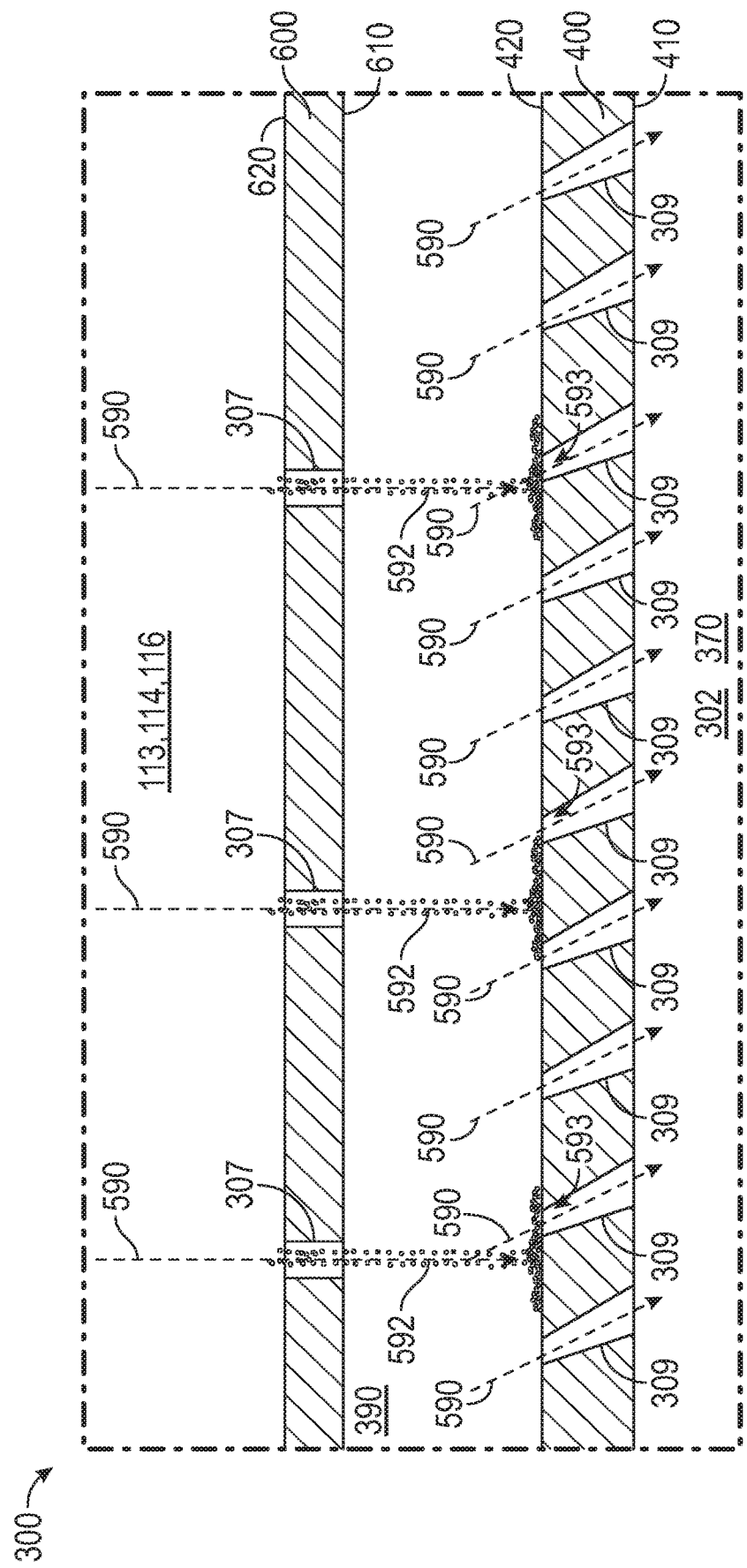
FIG. 3 is an enlarged view of a shell and a heat shield panel for use in a combustor of a gas turbine engine.

The air from the inner shroud 114 and the outer shroud 116 may then enter the combustion chamber 302 by means of one or more primary apertures 307 in the shell 600 and one or more secondary apertures 309, as shown in FIGS. 2 and 3. The primary apertures 307 and secondary apertures 309 may include nozzles, holes, etc. The air may then exit the combustion chamber 302 through the combustor outlet 308. At the same time, fuel may be injected into the combustion chamber 302 through the primary and/or secondary orifices of a fuel injector 320 and a pilot nozzle 322, which may be atomized and mixed with air, and then ignited and burned within the combustion chamber 302. The combustor 300 of the engine combustion section 26 may be housed within diffuser cases 124 which may define the inner shroud 114 and the outer shroud 116. The combustor 300 is housed within the diffuser case 124 between the inner shroud 114 and the outer shroud 116.

The combustor 300, as shown in FIG. 2, includes multiple heat shield panels 400 that are attached to one or more shells 600 (See FIG. 3). The heat shield panels 400 may be arranged parallel to the shell 600. The shell 600 includes a radially inward shell 600a and a radially outward shell 600b in a facing spaced relationship defining the combustion chamber 302 therebetween. The shell 600 also includes a forward shell 600c extending between the radially inward shell 600a and the radially outward shell 600b. The forward shell 600c further bounds the combustion chamber 302 on a forward end 300a of the combustor 300. The radially inward shell 600a and the radially outward shell 600b extend circumferentially around the longitudinal engine axis A. The radially inward shell 600a is located radially inward from the radially outward shell 600b.

The heat shield panels 400 can be removably mounted to the shell 600 by one or more attachment mechanisms 332. In some embodiments, the attachment mechanism 332 may be integrally formed with a respective heat shield panel 400, although other configurations are possible. In some embodiments, the attachment mechanism 332 may be a threaded mounting stud or other structure that may extend from the respective heat shield panel 400 through the interior surface to a receiving portion or aperture of the shell 600 such that the heat shield panel 400 may be attached to the shell 600 and held in place. The heat shield panels 400 partially enclose a combustion area 370 within the combustion chamber 302 of the combustor 300.

The combustor 300 also includes a forward dome 650 attached to the shell 600 at a forward end 300a of the combustor 300. The forward end 300a is located opposite an aft end 300b of the combustor 300, as illustrated in FIG. 2. The forward dome 650 is attached to the forward shell 600c of the combustor 300 via a radially inward fastener 652 and a radially outward fastener 654. The forward dome 650 includes a curved dome portion 656 that is operably shaped or curved to direct a portion of the airflow from the pre-diffuser 110 around the forward dome 650 and into the inner shroud 114 and the outer shroud 116. The forward dome 650 includes a radially inward linear portion 658 located on a radially inward side 651 of the forward dome 650 and a radially outward linear portion 660 located on a radially outward side 653 of the forward dome 650. The radially inward linear portion 658 is linear in shape. The radially outward linear portion 660 is linear in shape. The forward dome 650 is attached to the forward shell 600c at the radially inward linear portion 658 via the radially inward fastener 652. The forward dome 650 is attached to the forward shell 600c at the radially outward linear portion 660 via the radially outward fastener 654. The forward dome 650 transitions from the curved dome portion 656 to the radially inward linear portion 658 at a radially inward transition point 662, which may be a bend in the forward dome 650, as illustrated in FIG. 2. The forward dome 650 transitions from the curved dome portion 656 to the radially outward linear portion 660 at a radially outward transition point 664, which may be a bend in the forward dome 650, as illustrated in FIG. 2.

Referring now to FIG. 3, with continued reference to FIGS. 1 and 2, a heat shield panel 400 and shell 600 of the combustor 300 (see FIG. 2) conventionally used within the gas turbine engine 20 (see FIG. 1). Combustors 300 of gas turbine engines 20, as well as other components, experience elevated heat levels during operation. Impingement and convective cooling of heat shield panels 400 of the combustor 300 may be used to help cool the combustor 300. Convective cooling may be achieved by air that is channeled between the heat shield panels 400 and a shell 600 of the combustor 300. Impingement cooling may be a process of directing relatively cool air from a location exterior to the combustor 300 toward a back or underside of the heat shield panels 400.

Thus, heat shield panels 400 are utilized to face the hot products of combustion within a combustion chamber 302 and protect the overall shell 600 of the combustor 300. The heat shield panels 400 may be supplied with cooling air including dilution passages which deliver a high volume of cooling air into a hot flow path. The cooling air may be air from the compressor of the gas turbine engine 20. The cooling air may impinge upon a back side (i.e., second surface 420) of the heat shield panel 400 that faces the shell 600 inside the combustor 300. The cooling air may contain particulates, which may build up on the heat shield panels 400 overtime, thus reducing the cooling ability of the cooling air. Embodiments disclosed herein seek to address particulate adherence to the heat shield panels 400 in order to maintain the cooling ability of the cooling air.

The heat shield panel 400 and the shell 600 are in a facing spaced relationship. The heat shield panel 400 includes a first surface 410 oriented towards the combustion area 370 of the combustion chamber 302 and a second surface 420 opposite the first surface 410 oriented towards the shell 600. The shell 600 has an inner surface 610 and an outer surface 620 opposite the inner surface 610. The inner surface 610 is oriented toward the heat shield panel 400. The outer surface 620 is oriented outward from the combustor 300 proximate the inner shroud 114 and the outer shroud 116.

The shell 600 includes a plurality of primary apertures 307 configured to allow airflow 590 from the inner shroud 114 and the outer shroud 116 to enter a cavity 390 located between the shell 600 and the heat shield panel 400. Each of the primary apertures 307 extend from the outer surface 620 to the inner surface 610 through the shell 600.

Each of the primary apertures 307 fluidly connects the cavity 390 to at least one of the inner shroud 114 and the outer shroud 116. The heat shield panel 400 may include one or more secondary apertures 309 configured to allow airflow 590 from the cavity 390 to the combustion area 370 of the combustion chamber 302.

Each of the secondary apertures 309 extend from the second surface 420 to the first surface 410 through the heat shield panel 400. Airflow 590 flowing into the cavity 390 impinges on the second surface 420 of the heat shield panel 400 and absorbs heat from the heat shield panel 400.

As seen in FIG. 3, particulate 592 may accompany the airflow 590 flowing into the cavity 390. Particulate 592 may include but is not limited to dirt, smoke, soot, volcanic ash, or similar airborne particulate known to one of skill in the art. As the airflow 590 and particulate 592 impinge upon the second surface 420 of the heat shield panel 400, the particulate 592 may begin to collect on the second surface 420, as seen in FIG. 3. Particulate 592 collecting upon the second surface 420 of the heat shield panel 400 reduces the cooling efficiency of airflow 590 impinging upon the second surface 420 and thus may increase local temperatures of the heat shield panel 400 and the shell 600. Particulate 592 collection upon the second surface 420 of the heat shield panel 400 may potentially create a blockage 593 to the secondary apertures 309 in the heat shield panels 400, thus reducing airflow 590 into the combustion area 370 of the combustion chamber 302. The blockage 593 may be a partial blockage or a full blockage. Embodiments disclosed herein seek to reduce the amount of particulate entering the primary apertures 307.

Figure 4:
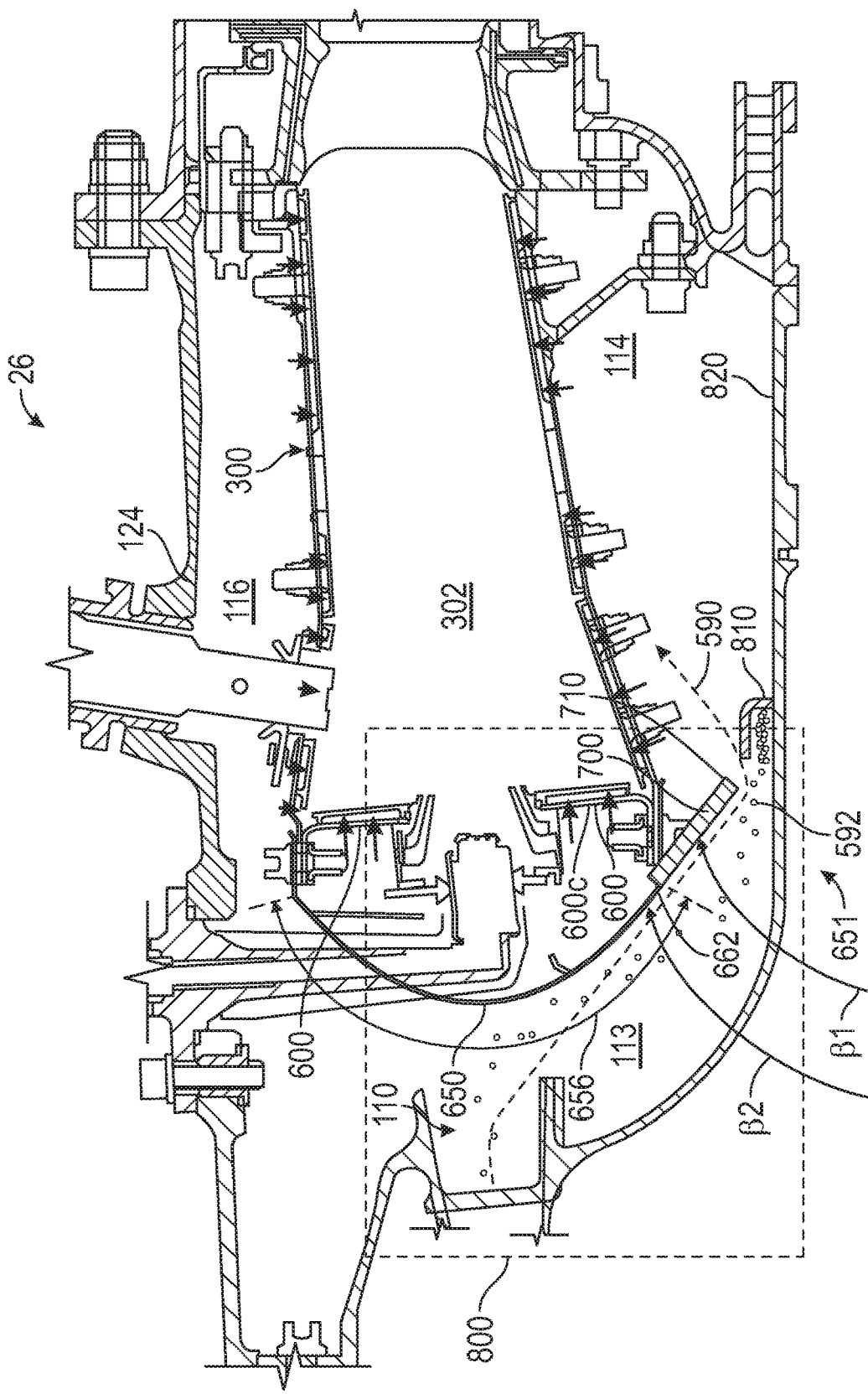
FIG. 4 is a cross-sectional illustration of a combustor having a deflector attached, in accordance with an embodiment of the present disclosure.

Referring now to FIG. 4, with continued reference to FIGS. 1-3, a deflector 700 attached to the forward dome 650 of the combustor 300. The deflector 700 is a body that extends away from the forward dome 650 and into the inner shroud 114. The deflector 700 may extend in an aft-ward and radially inward direction, as illustrated in FIG. 4. The deflector 700 may be linear in shape, as illustrated in FIG. 4. It is understood that the deflector 700 may be have various other shapes, and the embodiments disclosed herein may be applicable to shapes other than a linear shape, such, as, for example, a curvilinear shape. The deflector 700 may be attached to the forward dome 650 proximate a radially inward side 651 of the forward dome 650. The deflector 700 may be attached to the forward dome 650 proximate the radially inward transition point 662. It is understood that the embodiments disclosed herein may be applicable to a deflector attached to the radially outward transition point 664 and said deflector may extends aft-ward and in a radially outward direction away from the forward dome 650 and into the outer shroud 116. The deflector 700 may be oriented at an angle $\beta1$ relative to a longitudinal axis A of the gas turbine engine 20 about equal to an angle $\beta2$ of the curved dome portion 656 proximate the radially inward transition point 662 relative to the longitudinal axis A of the gas turbine engine 20.

Advantageously, by locating the deflector 700 proximate the radially inward transition point 622, the deflector 700 is located in a high velocity region 800 of airflow 590 flow from the dump region 113 to the inner shroud 114. Airflow 590 is at a higher velocity as the airflow 590 exits the pre-diffuser 110 and moves from the dump region 113 around the forward dome 650 to the inner shroud 114 relative to the velocity of the airflow 590 further aft into the inner shroud 114.

The deflector 700 is configured to force the airflow 590 in the high velocity region 800 to make a hard turn at a distal end 710 of the deflector 700. The deflector 700 terminates at a distal end 710 located in the inner shroud 114. The airflow 590 is able to make the turn around the distal end 710 of the deflector 700, however particulate 592 being carried along with the airflow 590 is typically not able to make this hard turn and centrifugal forces cause the particulate 592 to separate from the airflow 590. A catcher 810 may be located opposite of the deflector 700 on a radially inward wall 820 of the diffuser case 124, as illustrated in FIG. 4. The catcher 810 may be located aft of the deflector 700 as illustrated in FIG. 4.

Figure 5:
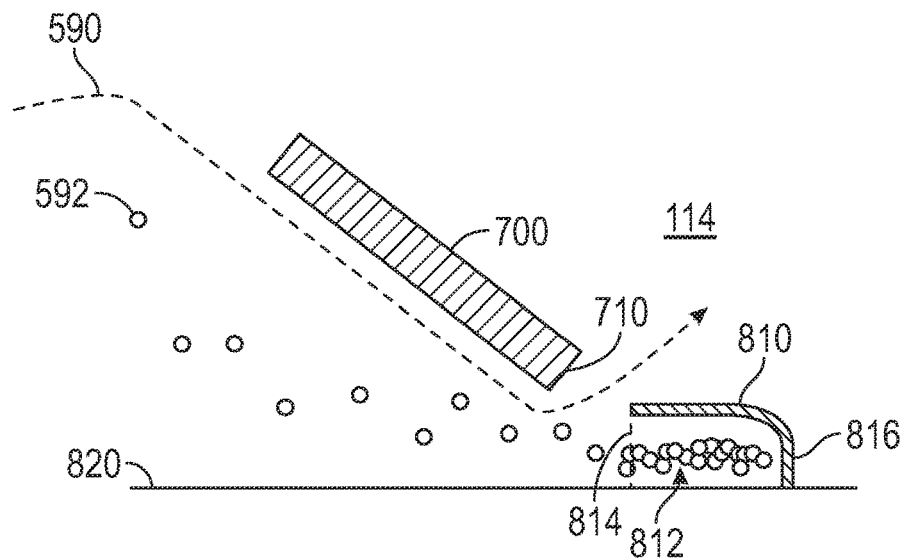
FIG. 5 is an enlarged illustration of a deflector and catcher, in accordance with an embodiment of the present disclosure.
Figure 6:
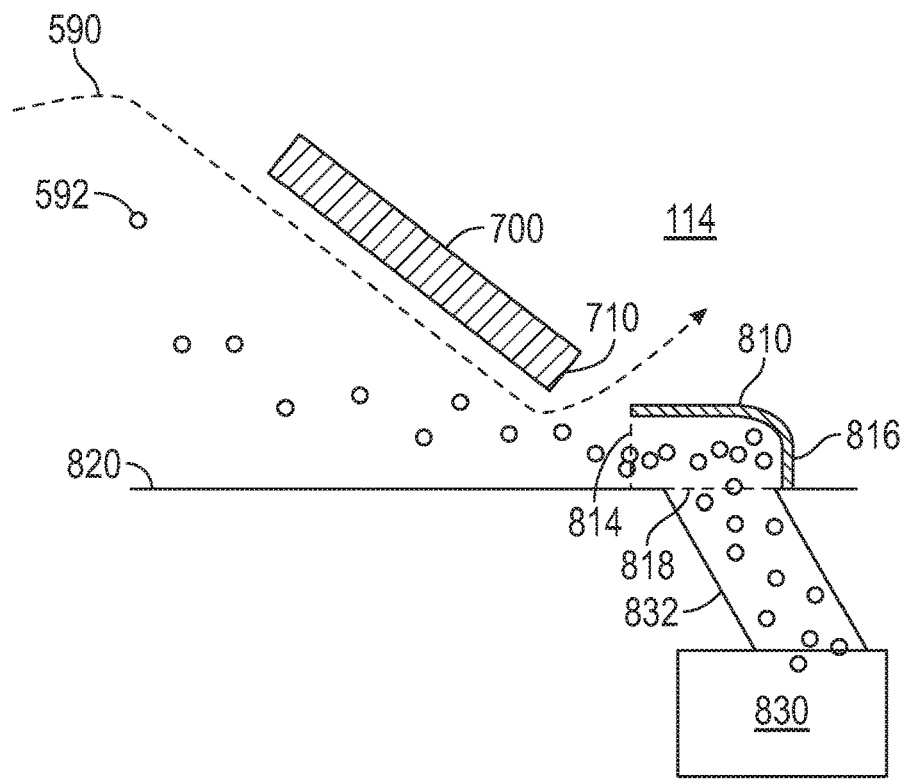
FIG. 6 is an enlarged illustration of a deflector and catcher, in accordance with an embodiment of the present disclosure.

Referring now to FIGS. 5 and 6, with continued reference to FIGS. 1-4, a deflector 700 and a catcher 810 are illustrated in accordance with an embodiment of the present disclosure. The catcher 810 may have half-"U", half "V" or "L" shape. The catcher 810 forms an internal chamber 812 with the radially inward wall 820, as illustrated in FIGS. 5 and 6. The catcher 810 includes a forward opening 814 to allow particulate 592 to enter into the internal chamber 812. The catcher 810 also includes a rear backstop 816 aft of the forward opening 814 to prevent particulate 592 from exiting the internal chamber 812 rearward or in the aft direction.

As illustrated in FIG. 5, the catcher 810 forms an internal chamber 812 with the radially inward wall 820 and the internal chamber 812 may catch and hold particulate 592 as the particulate 592 is being centrifugally separated from the airflow 590 proximate the distal end 710 of the deflector 700. In the example illustrated in FIG. 5, the particulate 592 may be contained in the internal chamber 812 of the catcher 810 until the gas turbine engine 20 undergoes maintenance to remove the particulate 592. As illustrated in FIG. 6, the catcher 810 forms an internal chamber 812 with the radially inward wall 820 and the internal chamber 812 may be fluidly connected to a particulate management unit 830 through an exit passageway 832. The internal chamber 812 is fluidly connected to the exit passageway 832 through a radially inward exit orifice 818 in the radially inward wall 820. The radially inward exit orifice 818 being fluidly connected to the internal chamber 812. The internal chamber 812 may catch particulate 592 as the particulate 592 is being centrifugally separated from the airflow 590 proximate the distal end 710 of the deflector 700 and then divert the particulate 592 through the exit passageway 832 to the particulate management unit 830. The particulate management unit 830 may hold the particulate 592 for safe keeping and/or expel the particulate 592 from the gas turbine engine 20.

Figure 7:
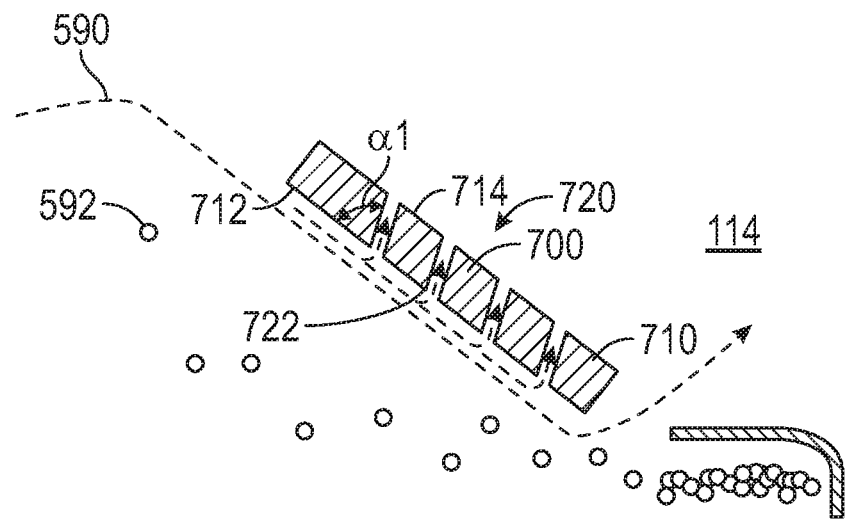
FIG. 7 is an enlarged illustration of a deflector having orifices, in accordance with an embodiment of the present disclosure.
Figure 8:
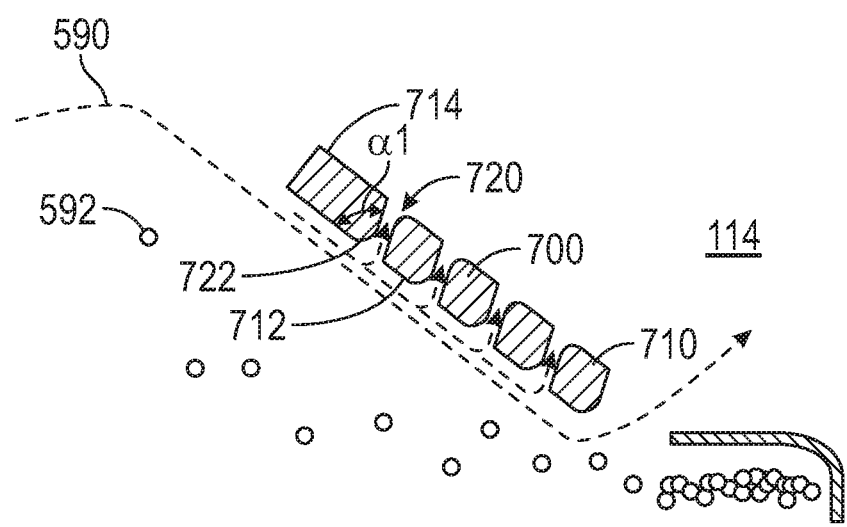
FIG. 8 is an enlarged illustration of a deflector having orifices with rounded corners, in accordance with an embodiment of the present disclosure.

Referring now to FIGS. 7 and 8, with continued reference to FIGS. 1-6, a deflector 700 is illustrated in accordance with an embodiment of the present disclosure. As previously shown the deflector 700 in FIGS. 4-6 may be a solid body with no orifices or the deflector 700 may be include one or more orifices 720 as illustrated in FIGS. 7 and 8. The orifice 720 may extend from a radially inward forward side 712 of the deflector 700 to a radially outward aft side 714 of the deflector 700. The radially outward aft side 714 being opposite the radially inward forward side 712. As illustrated in FIGS. 7 and 8, the one or more orifices 720 create additional passageways for airflow 590 to pass through the deflector 700, which advantageously reduces the pressure drop across the deflector 700. The orifices 720 may be operably shaped to turn the airflow 590 greater than or equal to 90 degrees. In other words, the orifice 720 may be oriented at an angle α1 relative to the radially inward forward side 712. In an embodiment, the angle α1 may be less than or equal to 90 degrees. The orifice 720 may include corners 722 that are square in shape as illustrated in FIG. 7 or corner 722 that are rounded in shape as illustrated in FIG. 8. The corners 722 that are rounded in shape may be adjacent to at least one of the radially inward forward side 712 and the radially outward aft side 714. Advantageously, corners 722 that are round in shape may further reduce the pressure drop across the deflector 700 in comparison to corners 722 that are square in shape.

Technical effects of embodiments of the present disclosure include incorporating a deflector proximate a forward dome of the combustor to centrifugally separate particulate from airflow prior to entering primary apertures of as combustor shell.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine, comprising:
   a diffuser case defining an inner plenum and an outer plenum, the inner plenum being radially inward of the outer plenum relative to a longitudinal axis of the gas turbine engine; and
   a combustor housed within the diffuser case between the inner plenum and the outer plenum, the combustor comprising:
   a radially outward shell;
   a radially inward shell;
   a forward dome attached to the radially outward shell and the radially inward shell at a forward end of the combustor; and
   a deflector attached to the forward dome and extending axially aft and radially inward away from the forward dome and the combustor,
   wherein the forward dome further comprises:
   a curved dome portion; and
   a radially inward linear portion,
   the forward dome being attached to the radially inward shell at the radially inward linear portion,
   wherein the forward dome transitions from the curved dome portion to the radially inward linear portion at a radially inward transition point,
   wherein the deflector is attached to the forward dome proximate the radially inward transition point,
   wherein the deflector is oriented at an angle relative to the longitudinal axis of the gas turbine engine about equal to an angle of the curved dome portion proximate the radially inward transition point relative to the longitudinal axis of the gas turbine engine, and
   wherein the deflector is linear, and the angle relative to the longitudinal axis of the gas turbine engine is maintained across the entire length of the deflector.

2. The gas turbine engine of claim 1, wherein the deflector extends into the inner plenum.

3. The gas turbine engine of claim 1, wherein the deflector is attached to a radially inward side of the forward dome.

4. The gas turbine engine of claim 1, wherein the deflector is a solid body.

5. The gas turbine engine of claim 1, wherein the deflector further comprises:
   a radially inward forward side;
   a radially outward aft side opposite the radially inward forward side; and
   one or more orifices extending from the radially inward forward side to the radially outward aft side.

6. The gas turbine engine of claim 5, wherein the one or more orifices are oriented at an angle less than or equal to 90 degrees relative to the radially inward forward side.

7. The gas turbine engine of claim 5, wherein the one or more orifices each include corners that are rounded in shape, each of the corners of each of the one or more orifices being adjacent to one of the radially inward forward side and the radially outward aft side.

8. The gas turbine engine of claim 1, further comprising:
   a catcher located opposite of the deflector on a radially inward wall of the diffuser case,
   the catcher forming an internal chamber with the radially inward wall,
   wherein the catcher comprises a forward opening to allow particulate to enter into the internal chamber.

9. The gas turbine engine of claim 8, wherein the catcher further comprises a rear backstop located aft of the forward opening.

10. The gas turbine engine of claim 8, further comprising:
a radially inward exit orifice in the radially inward wall, the radially inward exit orifice being fluidly connected to the internal chamber of the catcher.

11. A combustor for use in a gas turbine engine, the combustor comprising:
a radially outward shell;
a radially inward shell, radially inward of the radially outward shell relative to a longitudinal axis of the gas turbine engine;
a forward dome attached to the radially outward shell and the radially inward shell at a forward end of the combustor; and
a deflector attached to the forward dome and extending axially aft and radially inward away from the forward dome and the combustor,
wherein the forward dome further comprises:
a curved dome portion; and
a radially inward linear portion, the forward dome being attached to the radially inward shell at the radially inward linear portion,
wherein the forward dome transitions from the curved dome portion to the radially inward linear portion at a radially inward transition point,
wherein the deflector is attached to the forward dome proximate the radially inward transition point, and
wherein the deflector is oriented at an angle relative to the longitudinal axis of the gas turbine engine about equal to an angle of the curved dome portion proximate the radially inward transition point relative to the longitudinal axis of the gas turbine engine, and
wherein the deflector is linear, and the angle relative to the longitudinal axis of the gas turbine engine is maintained across the entire length of the deflector.

12. The combustor of claim 11, wherein the deflector is attached to a radially inward side of the forward dome.

13. The combustor of claim 11, wherein the deflector is a solid body.

14. The combustor of claim 11, wherein the deflector further comprises: a radially inward forward side; a radially outward aft side opposite the radially inward forward side; and one or more orifices extending from the radially inward forward side to the radially outward aft side.

15. The combustor of claim 14, wherein the one or more orifices are oriented at an angle less than or equal to 90 degrees relative to the radially inward forward side.

16. The combustor of claim 14, wherein the one or more orifices each include corners that are rounded in shape, each of the corners of each of the one or more orifices being adjacent to one of the radially inward forward side and the radially outward aft side.

* * * * *